United States Patent
Zimmet et al.

(10) Patent No.: US 8,645,464 B2
(45) Date of Patent: Feb. 4, 2014

(54) DETERMINING MEETING ATTENDEE READINESS

(75) Inventors: Carol Sue Zimmet, Boxborough, MA (US); Sean Callanan, Churchtown (IE); Ruthie D. Lyle, Durham, NC (US); Patrick Joseph O'Sullivan, Ballsbridge (IE); Fred Raguillat, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 13/006,844

(22) Filed: Jan. 14, 2011

(65) Prior Publication Data

US 2012/0185534 A1    Jul. 19, 2012

(51) Int. Cl.
 *G06F 15/16* (2006.01)
(52) U.S. Cl.
 USPC .......................................................... 709/204
(58) Field of Classification Search
 None
 See application file for complete search history.

(56) References Cited

U.S. PATENT DOCUMENTS

| 7,660,851 B2 * | 2/2010 | Manion et al. ............... 709/204 |
| 7,853,471 B2 * | 12/2010 | Zurko et al. ................. 705/7.19 |
| 2004/0141605 A1 | 7/2004 | Chen et al. |
| 2007/0264969 A1 | 11/2007 | Frank et al. |
| 2008/0071868 A1 * | 3/2008 | Arenburg et al. ............. 709/206 |
| 2009/0210822 A1 | 8/2009 | Schindler |
| 2009/0259718 A1 | 10/2009 | O'Sullivan et al. |
| 2009/0319607 A1 * | 12/2009 | Belz et al. .................... 709/204 |
| 2010/0179753 A1 * | 7/2010 | Agarwal et al. ............... 701/204 |
| 2010/0198646 A1 | 8/2010 | Mikan et al. |
| 2010/0211425 A1 | 8/2010 | Govindarajan |

OTHER PUBLICATIONS

IP.com, "Dynamic Meeting Agenda," IPCOM000195188D, Apr. 22, 2010, pp. 1-3.
IP.com, "System and Method to Manage Meeting Interest and Awareness," IPCOM000183558D, May 27, 2009, pp. 1-2.
IP.com, "System and method to Search & Locate a Person Through an IM User Proxy via RFID," IPCOM0001922862D, Feb. 4, 2010, pp. 1-4.
IP.com, "System for Creating a Visual Representation of Person Data Based on Physical Location, Applied to Address Book Entries and Buddy List Data," IPCOM000138921D, Aug. 10, 2006, pp. 1-3.

* cited by examiner

*Primary Examiner* — Scott Christensen
(74) *Attorney, Agent, or Firm* — Holland & Knight LLP; Brian J Colandreo, Esq.; Jeffrey T. Placker, Esq.

(57) ABSTRACT

Status information associated with at least one application associated with a meeting invitee is detected. An estimated arrival time of the meeting invitee to a meeting is determined based upon, at least in part, the status information. The estimated arrival time is provided to at least another invitee of the meeting.

21 Claims, 4 Drawing Sheets

DETERMINING MEETING ATTENDEE READINESS

BACKGROUND OF THE DISCLOSURES

The present disclosure relates to calendaring and scheduling events, and more particularly relates to determining estimating arrival times of meeting attendees.

In addition to live, in person meetings, current technology provides for many other real-time collaboration formats, such as conference calls, web conferences, and the like. Such real-time collaboration, be it in person or between dispersed individuals, naturally requires scheduling to ensure that everyone is attempting to engage in the collaboration at the same time. The various competing demands placed on individuals makes the time for collaboration a valuable commodity. Many times a person may be delayed in their current endeavor and is unable to attend, or running late joining a scheduled event. Delays of this type often leave attendees who have joined the scheduled event waiting for those persons to attend.

SUMMARY OF THE DISCLOSURE

According to a first implementation, a method includes detecting status information associated with at least one application associated with a meeting invitee. An estimated arrival time of the meeting invitee to a meeting is determined based upon, at least in part, the status information. The estimated arrival time is provided to at least another invitee of the meeting.

One or more of the following features may be included. The status information may include one or more of telephony status, instant messaging presence, keyboard activity, web conference presence, and email activity. Detecting status information may include receiving status information from an application specific probe. Determining an estimated arrival time may include identifying a change in the status information.

Providing an estimated arrival time may include providing one or more of a web feed, and instant message communication, and a web conference dialog. Providing the estimated arrival time may include providing at least a portion of the status information. The estimated arrival time of the meeting invitee to the meeting may be updated.

According to another implementation, a computer program product resides on a computer readable storage medium having a plurality of instructions stored on it. When executed by a processor, the instructions cause the processor to perform operations including detecting status information associated with at least one application associated with a meeting invitee. The instructions also cause the processor to determine an estimated arrival time of the meeting invitee to a meeting based upon, at least in part, the status information. The estimated arrival time is provided to at least another invitee of the meeting.

One or more of the following features may be included. The status information may include one or more of telephony status, instant messaging presence, keyboard activity, web conference presence, and email activity. The instructions for detecting status information may include instructions for receiving status information from an application specific probe. The instructions for determining an estimated arrival time may include instructions for identifying a change in the status information.

The instructions for providing an estimated arrival time may include instructions for providing one or more of a web feed, and instant message communication, and a web conference dialog. The instructions for providing the estimated arrival time may include instructions for providing at least a portion of the status information. Instructions may be included for updating the estimated arrival time of the meeting invitee to the meeting.

According to yet another implementation, a system includes a processor and a memory. A first software module is executable by the processor and the memory. The first software module is configured to detect status information associated with at least one application associated with a meeting invitee. A second software module is also executable by the processor and the memory. The second software module is configured to determine an estimated arrival time of the meeting invitee to a meeting based upon, at least in part, the status information. A third software module is also executable by the processor and the memory. The third software module is configured to provide the estimated arrival time to at least another invitee of the meeting.

One or more of the following features may be included. The status information may include one or more of telephony status, instant messaging presence, keyboard activity, web conference presence, and email activity. The first software module, configured to detect status information, may be further configured to receive status information from an application specific probe. The second software module, configured to determine an estimated arrival time, may be further configured to identify a change in the status information.

The third software module, configured to provide an estimated arrival time, may be further configured to provide one or more of a web feed, and instant message communication, and a web conference dialog. The third software module, configured to provide the estimated arrival time, may be further configured to provide at least a portion of the status information. A fourth software module may be executable by the processor and the memory. The fourth software module may be configured to update the estimated arrival time of the meeting invitee to the meeting.

The details of one or more implementations are set forth in the accompanying drawings and the description below. Other features will become apparent from the description, the drawings, and the claims.

DETAILED DESCRIPTION OF THE INVENTION

Figure 1:
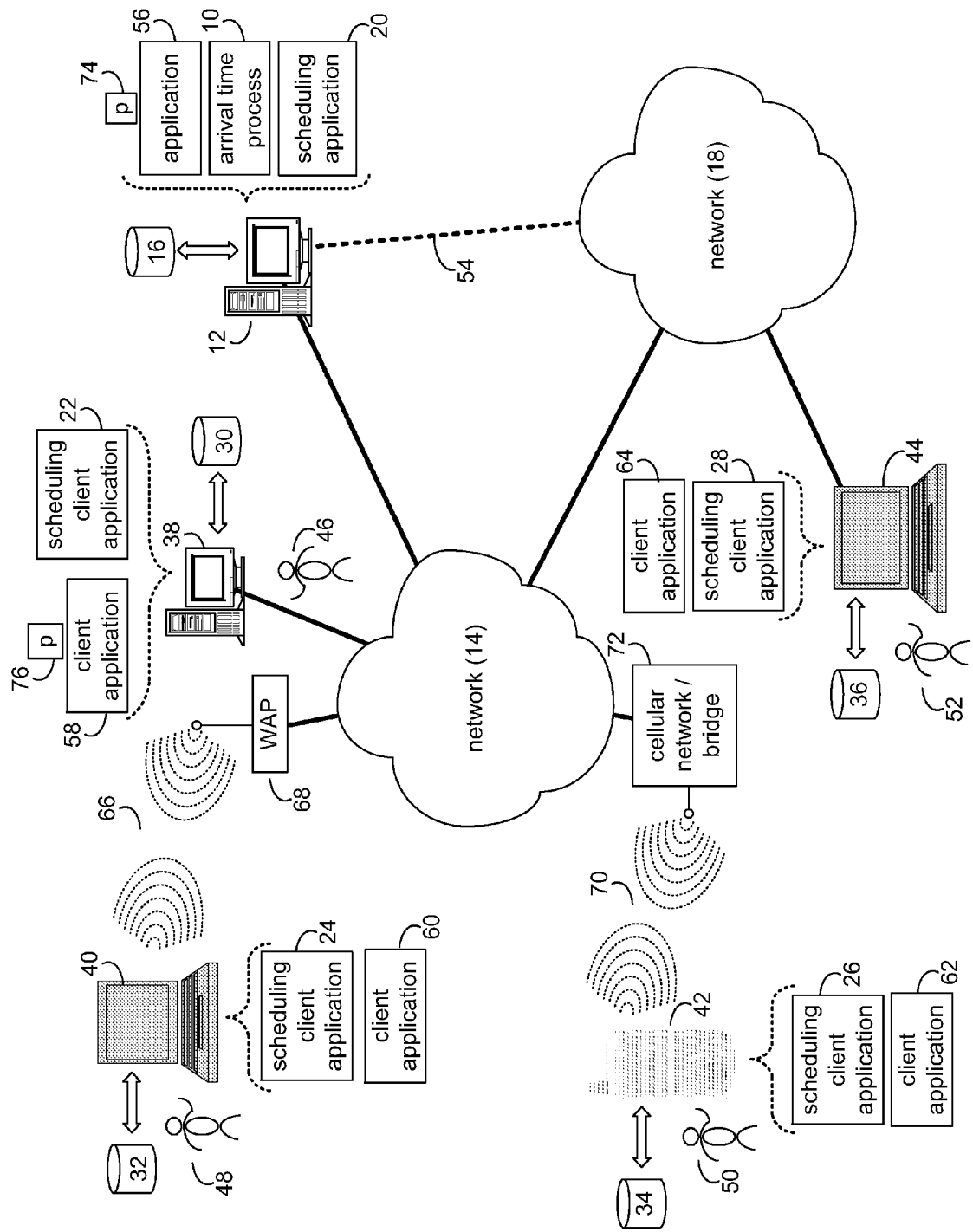
FIG. 1 diagrammatically depicts an arrival time process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown arrival time process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the arrival time process may reside on and be executed, in whole or in part, by a client electronic device, such as a personal computer, notebook computer, personal digital assistant, or the like.

As will be discussed below in greater detail, arrival time process 10 may detect status information associated with at least one application associated with a meeting invitee. Arrival time process 10 may determine an estimated arrival time of the meeting invitee to a meeting based upon, at least in part, the status information. Arrival time process 10 may also provide the estimated arrival time to at least another invitee of the meeting.

The instruction sets and subroutines of arrival time process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute a calendaring/scheduling application (e.g., scheduling application 20), examples of which may include, but are not limited to e.g., Lotus® Domino® Server and Microsoft Exchange Server® (Lotus and Domino are registered trademarks of International Business Machines Corporation in the United States, other countries, or both; and Exchange Server is a registered trademark of Microsoft Corporation in the United States, other countries, or both). Scheduling application 20 may interact with one or more scheduling client applications (e.g., scheduling client applications 22, 24, 26, 28) for routing and managing scheduling communications. Examples of scheduling client applications 22, 24, 26, 28 may include, but are not limited to, e.g., Lotus Notes® and Microsoft Outlook® (Lotus Notes is a registered trademark of International Business Machines Corporation in the United States, other countries, or both; and Outlook is a registered trademark of Microsoft Corporation in the United States, other countries, or both).

Arrival time process 10 may be a stand alone application, or may be an applet/application/script that may interact with and/or be executed within scheduling application 20. In addition/as an alternative to being a server-side process, the arrival time process may be a client-side process (not shown) that may reside on a client electronic device (described below) and may interact with a calendaring/scheduling client application (e.g., one or more of scheduling client applications 22, 24, 26, 28). Further, the arrival time process may be a hybrid server-side/client-side process that may interact with scheduling application 20 and a calendaring/scheduling client application (e.g., one or more of scheduling client applications 22, 24, 26, 28). As such, the arrival time process may reside, in whole, or in part, on server computer 12 and/or one or more client electronic devices.

The instruction sets and subroutines of scheduling application 20, which may be stored on storage device 16 coupled to server computer 12 may be executed by one or more processors (not shown) and one or more memory modules (not shown) incorporated into server computer 12.

The instruction sets and subroutines of scheduling client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access messaging application 20 and may allow users to e.g., send and receive instant messaging communications.

Users 46, 48, 50, 52 may access scheduling application 20 directly through the device on which the calendaring/scheduling client application (e.g., scheduling client applications 22, 24, 26, 28) is executed, namely client electronic devices 38, 40, 42, 44, for example. Users 46, 48, 50, 52 may access scheduling application 20 directly through network 14 or through secondary network 18. Further, server computer 12 (i.e., the computer that executes scheduling application 20) may be connected to network 14 through secondary network 18, as illustrated with phantom link line 54.

In addition to scheduling application 20, server computer 12 may execute various additional applications, e.g., application 56 (the instruction sets and subroutines of which may reside on storage device 16). Application 56 may include, but is not limited to, for example, a private branch exchange (PBX) management system (e.g., which may route, manage, log, etc., calls within a telephone network), an instant messaging server application, a voice over IP management application, an email server application, a web conferencing application (e.g., which may schedule, host, and/or manage one or more web conferences), a document library management application, or the like. Similarly, one or more of client electronic devices 38, 40, 42, 44 may execute a client application (e.g., client applications 58, 60, 62, 64, the instruction sets and subroutines of which may be stored on respective storage devices 30, 32, 34, 36). Examples of client application 58, 60, 62, 64 may include, but are not limited to, for example, a telephony client application (e.g., which may allow telephone calls to be placed via a PBX telephony system, a voice over IP telephone system, or the like), an instant messaging client application, an email client application, a web conferencing client application (e.g., which may include a web browser), and a monitoring application (e.g., which may monitor one or more activities of a user). While the various additional applications are shown as being executed on server computer 12, it should be appreciated that one or more of the additional applications may be executed on one or more separate devices, systems, and/or networks. Further, while a single additional application has been illustrated, this is for clarity of description, and should not be construed as a limitation as multiple additional applications may be implemented. Additionally, while client electronic devices 38, 40, 42, 44 have each been shown executing a single client application (e.g., client applications 58, 60, 62, 64) this is also for the purpose of clarity, as the client electronic devices may each operate a plurality of client applications.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

For the purpose of the following description, scheduling client application 22 and client application 58 may be discussed. However, this is for illustrative purposes only and should not be construed as a limitation of the present disclosure, as other scheduling client applications (e.g., client application 24, 26, 28) and other client applications (e.g., client applications 60, 62, 64) may be equally utilized.

Figure 2:
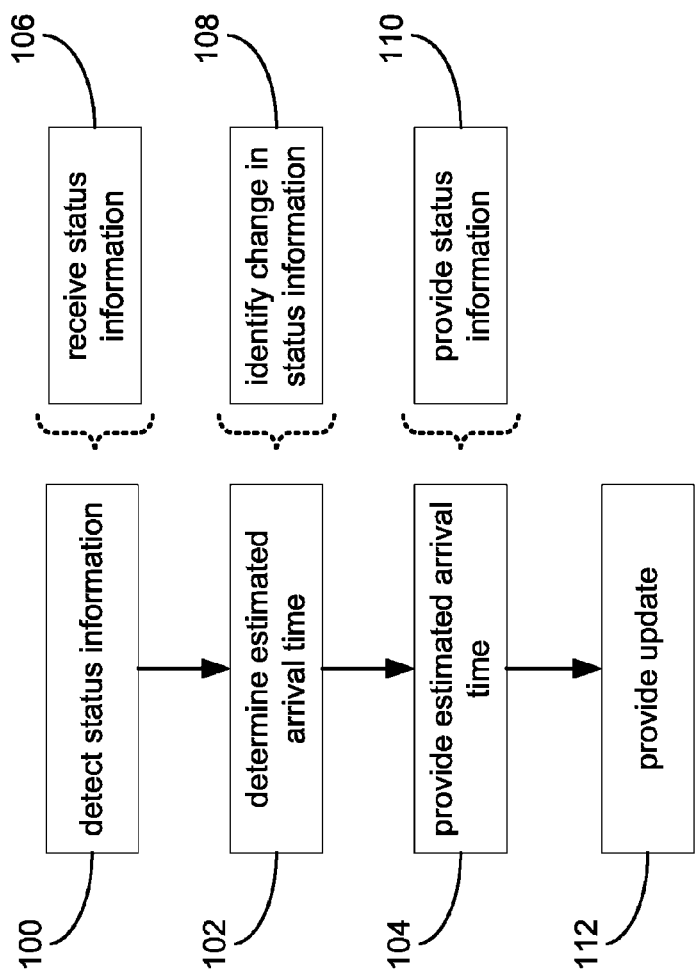
FIG. 2 is a flowchart of a process executed by the arrival time process of FIG. 1.

Referring also to FIG. 2, arrival time process 10 may detect 100 status information associated with at least one application associated with a meeting invitee. Arrival time process 10 may also determine 102 an estimated arrival time of the meeting invitee to a meeting based upon, at least in part, the status information. Arrival time process 10 may provide 104 the estimated arrival time to at least another invitee of the meeting. As such, arrival time process 10 may provide other attendees/invitees of the meeting insight as to the progress that is being made by the meeting invitee towards attendance (either in person or remote) of the meeting. As used herein, meeting may mean any scheduled event involving more than one individual, including in person events and remote events in which at least one participant is at a location different from at least another participant (e.g., a teleconference, a web conference, or the like).

For example, assume the user 46 is a meeting invitee by virtue of having received, and accepted, (e.g., via scheduling client application 22) an invitation to a meeting, for example, a web conference, at 3 PM on Wednesday with users 48, 50, and 52. However, as the time for the meeting approaches, user 46 may be occupied with other activities instead of attending the scheduled meeting. Arrival time process 10 may detect status information associated with at least one application associated with the meeting invitee (e.g., user 46), which may, for example, be indicative of user 46's progress toward attending the scheduled meeting (e.g., which may be indicative of user 46's preoccupation with other tasks or activities).

For example, arrival time process 10 may detect status information associated with a telephony application (e.g., a voice over IP application, a PBX management application, or the like), an instant messaging application, a web conference application, an email application, or other application. The status information may include, for example, telephony status. If user 46 is on a telephone call (e.g., either via a voice over IP application, a PBX telephone system, a cellular telephone call, or the like), arrival time process 10 may detect 100 the telephony status as "on a call," an identity of the other party to the call, the duration of the call, etc. Similarly, arrival time process 10 may detect 100 an instant messaging presence. For example, if user 46 is actively engages in an instant messaging conversation, arrival time process 10 may detect 100 one or more of user 46's "online" instant messaging availability status, a time since the last instant message sent by user 46, a time since the last instant message received by user 46 from the other party to the instant messaging conversation, time duration of the instant messaging conversation, and the like. In a similar manner, arrival time process 10 may detect 100 if user 46 is in the process of reviewing email (e.g., based upon an active ongoing email exchange with another email user, user 46 actively composing an email, or reviewing an open email). Similarly, arrival time process 10 may detect 100 user 46's presence in a parallel web conference (e.g., based upon, at least in part, user 46 being logged into the web conference). Various other status information associated with other applications may be detected 100, for example, based upon application keyboard activity (e.g., which may be indicative of active engagement of the user). For example, user 46 may be actively editing a document. Arrival time process 10 may detect such status information as an open document in a word processing application accompanied by keyboard activity (e.g., active typing). Status information associated with other activities may be detected 100 in a similar manner.

Detecting 100 status information may include receiving 106 status information from an application specific probe. For example, an application specific probe (e.g., server-side application specific probe 74 and/or client-side application specific probe 76) may include an application, applet, module, etc., of an application for which associated status information may be detected 100 by arrival time process 10. The application specific probe may be capable of monitoring status information associated with one or more users relative to one or more given applications. According to various embodiments, an application specific probe may monitor status information and transmit the status information to arrival time process 10, thereby allowing arrival time process 10 to detect 100 status information associated with at least one application associated with the meeting invitee by receiving 106 status information from the application specific probe (e.g., one or more of application specific probe 74, 76). Additionally/alternatively, the application specific probe may represent a web services endpoint that can be interrogated (e.g., by arrival time process 10) in real time and may be accessed by arrival time process 10, allowing arrival time process 10 to receive 106 status information. In such an embodiment, the application specific probes may utilize various web 2.0 technologies, such as AJAX, or other suitable technologies for monitoring client or server applications and providing status information to arrival time process 10.

For example, application 56 may include an electronic meeting (e-meeting) server application. Application specific probe 74 may make real time queries of the e-meeting server application to establish a current context of a person (e.g., user 46 in the present example) relative to the e-meeting server application (e.g., application 56). For example, application specific probe 74 may query application 56 (e.g., which may be an e-meeting server application) to determine if user 46 is presently logged onto the e-meeting and present in an ongoing e-meeting. Similarly, application specific probe 74 may query application 56 to, for example, determine status information relative to the e-meeting, such as how many other attendees are present in the e-meeting, if other users are logging out of the e-meeting, if there is an estimated time of completing of the e-meeting, and the like.

In a related manner, application 56 may include an instant messaging server application. In such an embodiment, application specific probe 74 may allow a web services request (e.g., by arrival time process 10) to establish if an individual (e.g., user 46 in the foregoing example) is currently engaged in an instant messaging conversation, what the nature of the conversation is (e.g., a one to one chat, or a one to many chat), how many instant messages have been exchanged, an instant message exchange frequency, and the like. Via the web services request, arrival time process 10 may receive 106 status information associated with application 56.

In a similar manner, application 56 may be a telephony application, such as a voice over IP application, a PBX management application, a cellular call management application (e.g., operated by a cellular service provider), or the like. Application specific probe 74 may allow a web services request (e.g., from arrival time process 10) for status information regarding an individual (e.g., user 46 in the above example). For example, arrival time process 10 may request status information such as, is user 46 engaged on a telephone call, who the call is with, is the call a one to one call or a conference call, how long has the call been going, etc.

The foregoing examples have discussed a server side application (e.g., application 56) and an associated application specific probe (e.g., application specific probe 74). These foregoing examples have been presented for the purpose of illustration and not limitation. In a similar manner to that described above, application specific probe 76 may provide status information regarding client application 58, allowing arrival time process 10 to receive status information associated with an application (e.g., client application 58) associated with a user (e.g., user 46). Client application 58 may include, for example, an e-meeting client application, an instant messaging or email application, a telephony application, or other application from which status information may be detected 100 by arrival time process 10.

Arrival time process 10 may also determine 102 an estimated arrival time of the meeting invitee to a meeting based upon, at least in part, the status information. For example, and continuing with the above example in which user 46 has a scheduled web conference at 3 pm, arrival time process 10 may detect that at 3 pm user 46 is logged into another web conference that is ongoing, and for which none of the other participants have logged off. As such, arrival time process 10 may determine 102 that user 46's arrival at the scheduled 3 pm web conference may not be immanent. Similarly, if at 3 pm user 46 is actively engaged in an instant messaging conversation with another user involving many instant messages and a relatively short latency between instant messages, arrival time process 10 may similarly determine 102 that user 46's arrival at the scheduled web conference may not be immanent. Arrival time process 10 may make similar determinations 102 of user 46's estimated arrival time based upon status information associated with various other applications.

Determining 102 an estimated arrival time may include identifying 108 a change in the status information. As such, arrival time process 10 may detect signs of change in behavior that may be indicative of the user making progress toward attending the scheduled event. Referring to the above example, in which user 46 is logged into another web conference at 3 pm, at 3:01 pm user 46 may log out of the other web conference. Arrival time process 10 may identify 108 the change in status information (e.g., user 46 has just logged off of the other web conference). Based upon, at least in part, the identified 108 change in status information, arrival time process may determine 102 an estimated arrival time of user 46 at the scheduled web conference as being likely immanent, in consideration of user 46 terminating the conflicting activity (i.e., logging out of the other web conference). In a related manner, even prior to user 46 logging off of the other web conference, arrival time process 10 may identify 108 that within the last three minutes five of an original eight participants in the other web conference have logged off of the web conference. As such, arrival time process 10 may determine 102 an immanent arrival of user 46 at the scheduled web conference, as the other web conference may be coming to an end (e.g., based upon users logging off of the other web conference). Other similar changes in status information may be identified 108, such as going offline relative to an instant messaging application, ending a telephone call, or the like.

Figure 3:
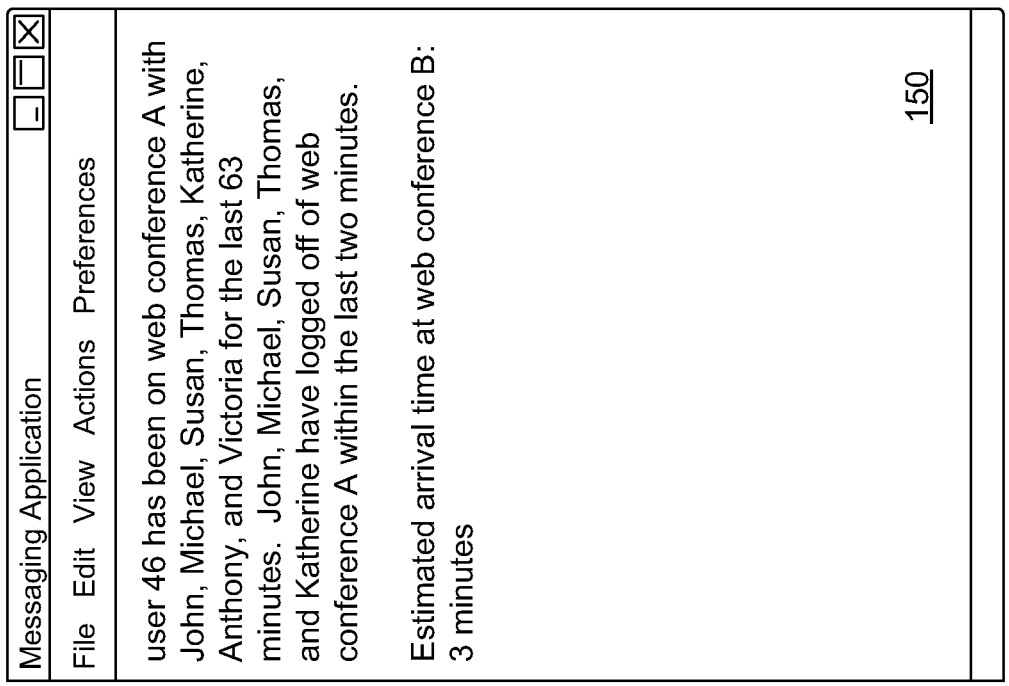
FIG. 3 graphically depicts an instant message provided by the arrival time process of FIG. 1 indicating an estimated arrival time of a meeting invitee.

Arrival time process 10 may provide 104 the estimated arrival time to at least another invitee of the meeting. Providing 104 an estimated arrival time may include providing one or more of a web feed, and instant message communication, and a web conference dialog. For example, and referring also to FIG. 3, another invitee (e.g., user 48) of the meeting (e.g., the web conference scheduled for 3 pm) may receive instant message 150. Instant message 150 may be generated by arrival time process 10. Continuing with the foregoing example, in which user 46 may be on a competing web conference (web conference A, in the instant example), in which five of the other participants have just logged off, arrival time process 10 may provide 104 instant message 150 indicating that user 46 will likely join the scheduled web conference (web conference B, in the instant example) within the next three minutes. Arrival time process 10 may provide 104 other indications of an estimated arrival time, such as a simple "arrival is immanent," or the like. Additionally, while not shown, arrival time process 10 may provide 104 the estimated arrival time via email, as a pop-up or dialog box within a web conference (such as the web conference that user 46 is scheduled to attend at 3 pm), or via various other suitable mechanisms.

Providing 104 the estimated arrival time may include providing 110 at least a portion of the status information. For example, and still referring to FIG. 3. arrival time process 10 may provide more detailed status information. For example, arrival time process 10 may provide 104 instant message 150 indicating that user 46 has been on a web conference (i.e., web conference A) with John, Michael, Susan, Thomas, Katherine, Anthony, and Victoria for the last 63 minutes. Instant message 150 may further indicate that John, Michael, Susan, Thomas, Katherine have logged off of web conference A within the last two minutes.

The level of detail provided 104 by arrival time process 10, who information is provided for, who information is provided about, and what meetings arrival time information may be available for may be based upon, at least in part, global and/or user specific preferences. For example, arrival time information may be provided for all scheduled meetings, only meetings scheduled by particular individuals, based upon a specified option during scheduling of the meeting, or other criteria or preference setting. Additionally, in some embodiments arrival time information may be provided 104 for each invitee of the meeting. In other embodiments, arrival time information may only be provided 104 for necessary invitees (such as presenters or senior personnel, etc.), invitees of a particular position, seniority, or the like (e.g., which may be based upon, at least in part, a corporate directory, such and an LDAP directory). Additionally, arrival time process 10 may provide 104 arrival time information to all invitees of the meeting. In other embodiments, arrival time process 10 may only provide 104 arrival time information to select invitees, such as the moderator of the meeting, etc. Additionally, the detail and nature of the information provided 104 by arrival time process 10 may be based upon, at least in part, established preferences. For example, arrival time process 10 may only provide 104 an estimated arrival time of the invitee. In other embodiments, arrival time process 10 may provide 104 status information, such as the activity the invitee is engaged in, other parties with whom the invitee is interacting with, and the like. It will be appreciated that various additional/alternative preferences may be set depending upon design criteria and user need.

Figure 4:
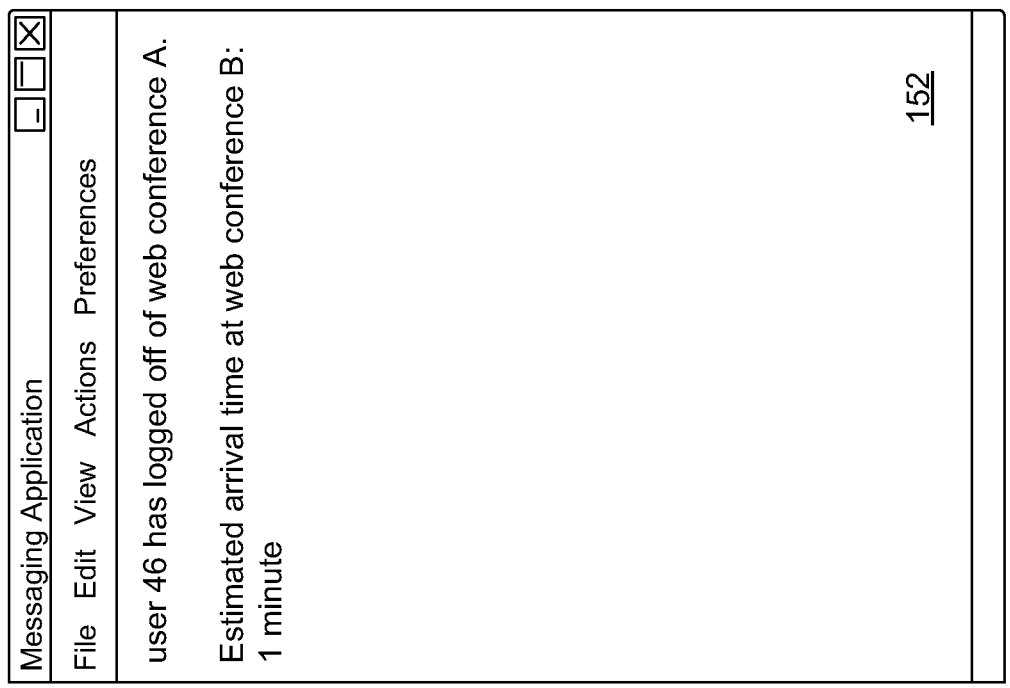
FIG. 4 graphically depicts an instant message provided by the arrival time process of FIG. 1 updating an estimated arrival time of the meeting invitee.

Arrival time process 10 may update 112 the estimated arrival time of the meeting invitee to the meeting. For example, and referring also the FIG. 4, arrival time process 10 may update 112 the estimated arrival time of user 46 via a subsequent instant message 152 (or other mechanism, such as a dialog box in a web conference system, etc., as discussed above). Continuing with the above-stated example, assume that shortly after instant message 150 was provided, indicating that user 46 was still logged onto the competing web conference (i.e., web conference A), user 46 logged off of the web conference. Arrival time process 10 may update 112 an estimated arrival time for user 46 via a subsequent instant message 152 indicating that user 46 has logged off of the prior web conference (i.e., web conference A). Similar updates may continue (e.g., based upon further identified 108 changes in status information, elapsed time, or the like) until the invitee joins the meeting. For example, arrival time process 10 may update 112 the estimated arrival time based upon, at least in part, identified changes in status information, at predefined time intervals (e.g., once a minute), or various other suitable configurations.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer implemented method comprising:
    detecting, by a computing device, status information associated with at least one application associated with a meeting invitee, wherein detecting status information includes receiving status information from an application specific probe that monitors usage of the at least one application associated with the meeting invitee to determine whether the meeting invitee is currently engaged in an activity, wherein the status information includes a current status of the meeting invitee engaging in the activity and a recent status of the meeting invitee engaged in the activity;
    determining, by the computing device, an estimated arrival time of the meeting invitee to a meeting based upon, at least in part, the status information, wherein the status information is indicative of progress toward the meeting invitee attending the meeting; and
    providing, by the computing device, the estimated arrival time to at least another invitee of the meeting.

2. The computer implemented method according to claim 1, wherein the status information includes one or more of telephony status, instant messaging presence, keyboard activity, web conference presence, and email activity.

3. The computer implemented method according to claim 1, wherein determining an estimated arrival time includes identifying a change in the status information.

4. The computer implemented method according to claim 1, wherein providing an estimated arrival time includes providing one or more of a web feed, and instant message communication, and a web conference dialog.

5. The computer implemented method according to claim 1, wherein providing the estimated arrival time includes providing at least a portion of the status information.

6. The computer implemented method according to claim 1, further comprising updating the estimated arrival time of the meeting invitee to the meeting.

7. The computer implemented method according to claim 1, wherein determining the estimated arrival time of the meeting invitee to the meeting includes detecting status information associated with at least one other user engaged in the activity with the meeting invitee.

8. A computer program product residing on a non-transitory computer readable storage medium having a plurality of instructions stored thereon, which, when executed by a processor, cause the processor to perform operations comprising:
    detecting status information associated with at least one application associated with a meeting invitee, wherein detecting status information includes receiving status information from an application specific probe that monitors usage of the at least one application associated with the meeting invitee to determine whether the meeting invitee is currently engaged in an activity, wherein the status information includes a current status of the meeting invitee engaging in the activity and a recent status of the meeting invitee engaged in the activity;
    determining an estimated arrival time of the meeting invitee to a meeting based upon, at least in part, the status information, wherein the status information is indicative of progress toward the meeting invitee attending the meeting; and
    providing the estimated arrival time to at least another invitee of the meeting.

9. The computer program product according to claim 8, wherein the status information includes one or more of telephony status, instant messaging presence, keyboard activity, web conference presence, and email activity.

10. The computer program product according to claim 8, wherein the instructions for determining an estimated arrival time include instructions for identifying a change in the status information.

11. The computer program product according to claim 8, wherein the instructions for providing an estimated arrival time include instructions for providing one or more of a web feed, and instant message communication, and a web conference dialog.

12. The computer program product according to claim 8, wherein the instructions for providing the estimated arrival time include instructions for providing at least a portion of the status information.

13. The computer program product according to claim 8, further comprising instructions for updating the estimated arrival time of the meeting invitee to the meeting.

14. The computer program product according to claim 8, wherein determining the estimated arrival time of the meeting invitee to the meeting includes detecting status information associated with at least one other user engaged in the activity with the meeting invitee.

15. A system comprising:
a processor;
a memory;
a first software module executable by the processor and the memory, the first software module configured to detect status information associated with at least one application associated with a meeting invitee, wherein the first software module is further configured to receive status information from an application specific probe that monitors usage of the at least one application associated with the meeting invitee to determine whether the meeting invitee is currently engaged in an activity, wherein the status information includes a current status of the meeting invitee engaging in the activity and a recent status of the meeting invitee engaged in the activity;
a second software module executable by the processor and the memory, the second software module configured to determine an estimated arrival time of the meeting invitee to a meeting based upon, at least in part, the status information, wherein the status information is indicative of progress toward the meeting invitee attending the meeting; and
a third software module executable by the processor and the memory, the third software module configured to provide the estimated arrival time to at least another invitee of the meeting.

16. The system according to claim 15, wherein the status information includes one or more of telephony status, instant messaging presence, keyboard activity, web conference presence, and email activity.

17. The system according to claim 15, wherein the second software module, configured to determine an estimated arrival time, is further configured to identify a change in the status information.

18. The system according to claim 15, wherein the third software module, configured to provide an estimated arrival time, is further configured to provide one or more of a web feed, and instant message communication, and a web conference dialog.

19. The system according to claim 15, wherein the third software module, configured to provide the estimated arrival time, is further configured to provide at least a portion of the status information.

20. The system according to claim 15, further comprising a fourth software module executable by the processor and the memory, the fourth software module configured to update the estimated arrival time of the meeting invitee to the meeting.

21. The system according to claim 15, wherein the second software module, configured to determine the estimated arrival time of the meeting invitee to the meeting, is further configured to detect status information associated with at least one other user engaged in the activity with the meeting invitee.

* * * * *